United States Patent [19]

Albanese

[11] 4,439,342

[45] * Mar. 27, 1984

[54] AEROSOL PREPARATION

[75] Inventor: James J. Albanese, House Springs, Mo.

[73] Assignee: United Industries Corporation, St. Louis, Mo.

[ * ] Notice: The portion of the term of this patent subsequent to Mar. 27, 2001 has been disclaimed.

[21] Appl. No.: 237,155

[22] PCT Filed: Jan. 17, 1980

[86] PCT No.: PCT/US80/00036

§ 371 Date: Sep. 2, 1980

§ 102(e) Date: Sep. 2, 1980

Related U.S. Application Data

[63] Continuation-in-part of Ser. No. 58,732, Jul. 23, 1979, abandoned, which is a continuation-in-part of Ser. No. 932,211, Aug. 9, 1978, abandoned.

[51] Int. Cl.[3] .......... C09K 3/30

[52] U.S. Cl. .......... 252/305; 71/64.08; 71/110; 71/DIG. 1; 106/10; 106/243; 252/10; 252/311; 252/312; 424/43; 424/45; 424/46; 426/811; 524/230; 524/903

[58] Field of Search .......... 252/49.5, 10, 311, 312, 252/305; 426/811; 71/64.08; 424/43, 45, 358; 106/10, 243; 524/230, 903

[56] References Cited

U.S. PATENT DOCUMENTS

| | | | |
|---|---|---|---|
| 2,524,590 | 10/1950 | Boe | 252/305 |
| 2,552,321 | 5/1951 | Jayne, Jr. et al. | 260/404.5 |
| 2,887,460 | 5/1959 | Dibert et al. | 545/245 |
| 2,907,664 | 10/1959 | Schoenholz et al. | 106/10 |
| 3,301,808 | 1/1967 | Mack, Jr. et al. | 252/305 X |
| 3,330,730 | 7/1967 | Hernandez | 424/47 |
| 3,387,008 | 6/1968 | Cawley | 260/404 |
| 3,433,868 | 3/1969 | Brechner et al. | 424/47 |
| 3,650,956 | 3/1972 | Strand et al. | 252/90 |
| 3,679,102 | 7/1972 | Charle et al. | 252/305 X |
| 3,705,855 | 12/1972 | Marschner | 252/90 |
| 3,847,622 | 11/1974 | Brandl et al. | 106/10 |
| 3,896,975 | 7/1975 | Follmer | 222/192 |
| 3,929,492 | 12/1975 | Chapman et al. | 252/305 X |
| 3,984,364 | 10/1976 | Taub | 222/192 X |
| 3,998,775 | 12/1976 | Taub | 524/106 |
| 4,014,841 | 3/1977 | Taub | 524/246 |
| 4,073,412 | 2/1978 | Doumani | 222/192 |
| 4,083,954 | 4/1978 | Tsuchiya et al. | 424/47 |
| 4,110,427 | 8/1978 | Kalat | 424/46 |

FOREIGN PATENT DOCUMENTS

| | | | |
|---|---|---|---|
| 683288 | 12/1966 | Belgium | 424/47 |
| 1439945 | 4/1966 | France | 424/47 |
| 2320729 | 3/1977 | France | 424/47 |
| 939366 | 10/1963 | United Kingdom | 252/548 |
| 945333 | 12/1963 | United Kingdom | 252/548 |
| 1026831 | 4/1966 | United Kingdom | 424/45 |
| 1282942 | 7/1972 | United Kingdom | 8/429 |
| 1293613 | 10/1972 | United Kingdom | 252/90 |
| 1296356 | 11/1972 | United Kingdom | 424/47 |
| 1295036 | 11/1972 | United Kingdom | 8/429 |
| 1317183 | 5/1973 | United Kingdom | 252/102 |
| 1322084 | 7/1973 | United Kingdom | 8/429 |
| 1384244 | 2/1975 | United Kingdom | 252/546 |

OTHER PUBLICATIONS

Chem. Abstracts, vol. 76, 1972, pp. 64,65, Item 15723f.

*Primary Examiner*—Richard D. Lovering
*Attorney, Agent, or Firm*—Kalish & Gilster

[57] ABSTRACT

An aerosol preparation of water base character for providing a continuous film upon dispensing comprising a water phase and a continuous phase wherein the active ingredient may be water soluble or water insoluble, or may be in emulsions, a liquefied or compressed gas propellant, or combinations thereof, an agent for controlling the manner in which the propellant leaves the developed film, and a dispersal agent consisting of cocodiethanolamide.

23 Claims, No Drawings

AEROSOL PREPARATION

This application is a continuation-in-part of application Ser. No. 58,732 filed July 23, 1978 upon "Aerosol Preparation" which now, in the interim has become abandoned, which said application was a continuation-in-part of application Ser. No. 932,211 filed Aug. 9, 1978 upon Aerosol Preparation, now abandoned, and succeeded by pending continuation application Ser. No. 282,050 filed July 10, 1981.

This invention relates in general to aeroseol preparations and more particularly such preparations of water base character for providing a continuous unbroken film upon dispensing.

Heretofore, there have been innumerable, consistently unsuccessful efforts to develop an aerosol emulsion for providing a continuous, uninterrupted film or coating, whether for decorative or protective purposes, such as with paints, various types of finishes, lubricants, etc., wherein water constitutes the continuous or external phase.

It is recognized that many active ingredients for film formation may be emulsified, but to date emulsion technology has not been satisfactory for providing a continuous film in an efficacious manner. Shortcomings of existing emulsion technology are two-fold:

(a) Those relating to oil in water have failed because the hydrophobic active ingredients must of necessity be in the oil phase and in this type of emulsion water is the continuous phase. Consequently, there is no molecular continuity of the active ingredient so that the resultant film would be discontinuous with uneven distribution of the active ingredient. An example would be the commercial silicone emulsions which are basically low viscosity polydimethylsiloxanes emulsified in water and in these emulsions the water is on the outside or in the continuous phase. Attempting to use such an emulsion as a mold release, for example, would have disappointing results because the silicone would be distributed unevenly upon the applied surface and the compound would not serve to bring about reliable mold release.

(b) Those resultant from water in oil are due to the altered nature of the active ingredient. Though the active ingredients as in the continuous phase by the nature of the present emulsion technology, these active ingredients are altered by the presence of water and/or emulsifiers and their performance is not what would be expected should such have been applied in pure form or in solvent reduction. The active ingredients as applied are altered in appearance from the pre-emulsion state. For instance, active ingredients which have been transparent become pasty or creamy; resultant applications have been disappointing. Exemplary of this would be to prepare a silicone emulsion wherein the silicone would be in the oil or continuous phase and attempt to use this as a mold release. Experience has shown that although the distribution of the silicone may be even and continuous in this type of emulsion, the presence of the water and/or emulsifiers severely limits the release effect of the silicone. These compounds simply have not worked. When applied the silicone emulsion is paste-like or creamy in appearance and not characteristic of the transparent quality of polydimethylsiloxane which would be the preferred appearance.

The present accepted incapacity of aerosols to be useful with water based coating agents, as for example, latex paints, has been an especial problem of long standing. With present technology, aerosols that require a smooth finish or film on spraying, such as paints, silicone, or the like have utilized solvents other than water as the vehicle. Typical of such solvents are hydrocarbons, such as aromatics, aliphatics, chlorinateds, fluorinateds and the like, wherein, in most instances, the propellant is generally soluble in such solvents and may be considered chemically as part of the solvent active mixture. Thus, in effect, resort has necessarily been made to a single phase system or solution wherein the active ingredient, such as an oil-based paint, is dissolved within a suitable solvent other than water, as particularly, within a wide range of compatible organic solvents. However, the utilization of such solvents or carriers has involved inherent peril factors, as for example, aerosol paint is extremely flammable by reason of the incorporated solvent; and the majority of commercially used and available solvents have low threshold limit values that are intensified by the atomization process of the selected aerosol. Furthermore, most of these solvents have undesired ecological consequences in bringing about a further depletion of fossil fuel resources; as well as being uneconomic in light of the continual rise in cost therefor. Additionally, these solvents consistently cause unpleasant and even obnoxious odors.

There has, accordingly, been a continuing effort to solve this problem as such would eliminate immediately the recognized and reluctantly accepted hazards of using areosol systems with respect to oil based paints, among others.

Therefore, it is an object of the present invention to provide an aerosol preparation which is water based and is productive of an uninterrupted, continuous film; which eliminates all of the various hazards associated with the dispensing of aerosolized ingredients carried in the requisite organic solvents or vehicles; and which obviates the use of an auxiliary solvent for the propellant.

It is another object of the present invention to provide a preparation of the character stated which is capable of producing a continuous film from a broad spectrum of film and coating agents, such as water-base paints, lubricants, sealants, mold release, protective coatings, waxes, and the like; and which incorporates an agent for controlling, through the molecular structure thereof, the manner in which the propellant leaves the film.

It is a further object of the present invention to provide a preparation of the character stated wherein an agent is embodied for controlling the manner in which the propellant leaves the film, and with there being a dispersal agent for synergistically acting with said film controlling agent to provide a resultant film having leveling characteristics of being smooth, even, and unbroken; with molecular continuity of the active ingredient.

It is a further object of the present invention to provide a preparation of the character stated which may incorporate as active ingredients liquids as well as flowable powders, without the necessity of predilution.

It is another object of the present invention to provide a preparation which effects the use of water as a carrier for hydrophobic chemicals, for chemicals that have previously been delivered by means of petrochemical or other non-aqueous solvents, and for improving the effectiveness of systems which presently incorporate water as a carrier.

It is a further object of the present invention to provide a preparation of the character stated which is capable of the equally efficacious application of both water soluble and water insoluble active ingredients for providing a continuous film and wherein the physical and chemical characteristics of such ingredients are unaltered from the prediluted state thereof.

It is a still further object of the present invention to provide a preparation of the character stated which upon dispensing provides a continuous film as distinguished from the foams and sprays heretofore attained by aerosolization of emulsions; which films are nonproductive of corrosion; which are not fundamentally flammable or toxic so that circumscription as to usage is eliminated thereby presenting a breadth of application hitherto unknown in the aerosol field.

It is another object of the present invention to provide a preparation of the character stated which has a substantially indefinite shelf life; merely requiring a degree of agitation prior to each application regardless of the transpired interval between dispensing.

It is a further object of the present invention to provide a preparation of the character stated which may be most economically produced; there being no necessity of complex instrumentation and equipment for formulations as the same may be accomplished in accordance with well-known production techniques; and which may be charged to individual containers and subjected to the preferred propellant with presently, generally utilized equipment.

Another object of the present invention is to provide a preparation of the type stated which is extremely effective in use; which has demonstrated a remarkable versatility in being adapted for accommodating a most extensive range of varied film-producing agents so as to be endowed with a unique neo-universality; and which preparation may be most economically produced and sold; and with the films developed thereby being tenacious, durable, and proof against rupture, scuffing or the like through the normal intended usage peculiar to the particular film.

The present invention contemplates the development of an aerosol preparation which through its unusual characteristics is both physically and chemically distinct from the customary aerosol emulsions, as well as from the single phase solutions heretofore used for film formation by oil based paints and the like. The system of the present preparation does embody generally immiscible phases, one of which may be considered a water phase, the other a continuous phase, which phases are normally clearly defined, sharply distinct, and separated. The active ingredient, for the purposes of this invention, is primarily in the "oil" or continuous phase, even if it is water soluble. In addition, the film controller and propellant are part of the continuous phase. However, there is also, and most critically, provided within the continuous phase a predetermined quantity of what might be referred to as a dispersal agent, being soluble in both of said phases but in different degrees.

The preparation will thus in its normal state be unhomogenized with the two phases being sharply separated.

When the preparation is to be utilized, immediately prior thereto the same is agitated and then substantially instantaneously dispensed, with the discharged material being a transitory mixture. As applied, the dispensed matter will present a continuous film upon the particular surface, uninterrupted by any type of lacunae, pores, or geometric formations so that a coating with desired thickness and being entirely continuous is developed. As indicated, the present invention has been proved to be completely successful with water based paints, as well as numerous other film-producing agents. Although the constituents of the preparation will be discussed in greater detail below, attention is directed to the unique dispersal agent which is critical for the development of aerosol preparations of this invention. It has been found that a specific cocodiethanolamide from that class of chemicals which has been heretofore recognized as emulsifiers possesses certain unexpected and surprising properties when used in a predetermined proportionality in the two phase system of the present invention. This particular cocodiethanolamide is an amber liquid having a congealing point of approximately 6° C. and with a specific gravity at 25% C. of 0.99. The free or unreacted fatty acid, as lauric, is 3%–4% maximum and the pH of a 1% dispersion is between 8 and 9. This compound is soluble in alcohols, glycols, ketones, esters, aromatic and aliphatic carbons, and chlorinated solvents, while also being dispersible in water at low concentrations of 1 to 2%. It is also soluble at higher concentrations and with a 10% solution being quite viscous approximating a gel.

It is to be thus understood that the term "cocodiethanolamide" as referred to and described herein shall be that form of the compound possessing the above-described physical and chemical characteristics.

It has been discovered that providing cocodiethanolamide in an amount approximating 0.5% by weight of the system or preparation will react with the water phase and the continuous phase when it is not in an emulsion to bring about what is generally considered an unstable emulsion, that is, wherein the phases tend to separate, but are capable of being brought into relative stability by agitation, and upon spraying the phases separate and revert to their constituent components whereby the active ingredient does not produce a continuous film but one which is highly irregular and interrupted, typical of the results obtained to the present time when water based solvents are utilized in aerosol form.

If the proportionality of the cocodiethanolamide is increased as within the range of immediately above 0.5% to approximately 2.5% by weight, when the active ingredient is initially in an unemulsified condition, a resulting stable emulsion is developed and thus the cocodiethanolamide acts in the expected manner of an emulsifying agent so that upon dispensing of such a preparation containing such proportionality, a discontinuous broken film may be presented despite the fact that the emulsion is stable. In its generally normal state such emulsion gives a visual appearance of a homogenous, pasty character, consistent with its being considered stable. Thus, the foregoing merely underscores that cocodiethanolamide as used in the aforesaid proportion with the active ingredients of the preparations of this invention, when such active ingredients are initially in an unemulsified condition, serves in its characteristic function as an emulsifying agent.

However, if the quantity of cocodiethanolamide is increased beyond 2.5% as within the specific range of 2.5 to 10% by weight, the system developed as hereinabove described loses its stability so that a separation immediately takes place which, at first glance, would bear a seeming resemblance to the unstable emulsion incorporating a 0.5% by weight of said agent as above described. Depite any visual similarity between the phase separations of the unstable emulsion and the preparation incorporating in excess of 2.5% by weight of cocodiethanolamide, such generally corresponding phases are quite different both chemically and physically. It is suggested that the preparation with the greater quantity of cocodiethanolamide has become a dispersion, that is atypical of traditional technology having, as stated, the immiscibility of the two phases being sharply defined. Without any intention of limitation, the preparation herein will be referred to as a "dispersion" to facilitate exposition. The agitation prior to dispensation merely promotes a momentary intermixture so that upon discharge the dispersion characteristics control as distinguished from the emulsion characteristics which would be overriding if the cocodiethanolamide was below 2.5%. A continuous film is promoted by the dispersion as distinguished from the discontinuous character of the dispensing of an emulsion.

As developed more fully hereinbelow, the preferred effective range of cocodiethanolamide for aerosol preparations of the present invention is 2.5 to 3.5% by weight when the active ingredients are initially in an unemulsified state. However, research has demonstrated that additional amounts up to 10% by weight bring about no diminution in the character and quality of the developed film. Above 10% it has been discovered that the applied coating develops an undesirable thickness of a generally lumpy character so that beyond such limit a continuous, unbroken film is no longer achievable.

This crucial, unexpected action caused by the cocodiethanolamide is all the more apparent when one recognizes that the use of emulsifying agents in emulsions cause a predictive response. It is recognized that there are numerous factors which contribute to the relative stability or instability of a particular emulsion but generally when the emulsifier is below a predetermined proportionality the associated emulsion will be is an unstable state with the phases separated. As the emulsifier is added, the emulsion becomes relatively stable, with the phases intermixing to present a homogeneous appearance; and further addition of the emulsifier generally has no effect upon the stability of the emulsion. But with the present invention the further addition of cocodiethanolamide beyond substantially 2.5% by weight of the system brings about a destruction of the erstwhile stability so that if a stable emulsion did exist, one would necessarily expect that the further addition of the cocodiethanolamide would be without effect. As pointed out, this unusual and surprising action of this particular agent supports the view that the system is no longer an emulsion with all of the various accepted emulsion characteristics but becomes a dispersion, with the cocodiethanolamide manifestly ceasing to act as an emulsifying agent. Therefore, the crucialness of this agent to preparations formed in accordance with this disclosure is apparent. It will be fully understood that no other compound has been found to possess the requisite properties despite extensive investigatory efforts.

As developed hereinabove the systems of the present invention are discussed as being in a non-emulsified state, independent of the cocodiethanolamide. However, the foregoing clearly comprehends that through the addition of the cocodiethanolamide, the various systems transitorily move into an unstable emulsion, then into a stable emulsion as further cocodiethanolamide is added, and then into a dispersion as the requisite energy level is achieved through the incorporation of a predetermined amount of cocodiethanolamide. Theoretically, a requisite amount of energy is manifestly required to achieve the dispersion state attained by the predetermined amount of cocodiethanolamide. Understandably, the intermediate or transitory unstable and stable states of emulsion also requiire respective critical energy levels. Accordingly, the present invention teaches that the specific cocodiethanolamide imparts certain characteristics to water and oil mixtures when used as described and in a quantity requisite to provide the necessary energy to exceed a stable emulsion state as such is determined in accordance with recognized technology. The extreme importance of this unique property is more fully understood when the cocodiethanolamide is added to existing stable or unstable emulsions.

It has been found that adding 0.5% by weight of cocodiethanolamide to a preparation which contains a stable emulsion is adequate to provide the necessary energy to cause such preparation to take on the unique characteristics of the dispersion of the present invention.

With preparations comprising unstable emulsions, the cocodiethanolamide must be added in a quantity sufficient to provide the necessary energy to render such emulsions stable and then to progress therebeyond to the unusual and unexpected dispersion state developed by the present invention. It is understood that the emulsified conditions of such active ingredients, that is whether the same are in stable or unstable state and to what degree, may be readily determined by well-known, widely practiced technology so that as the cocodiethanolamide is added to unstable emulsions one may determine when the point of stability has been reached and then proceed with further incorporation of cocodiethanolamide to attain the dispersion with the resultant preparation having the predetermined characteristics.

It should be, of course, understood that with unstable emulsions as herein discussed, generally accepted emulsifying agents may be used for rendering such systems stable and with the cocodiethanolamide being thus added thereafter. Consequently, nothing herein is to be interpreted as requiring the use of cocodiethanolamide for raising the energy level of unstable emulsions to that of stable emulsions. The primary point is that cocodiethanolamide provides its unique functions only after the particular emulsion has reached a state of stability.

Illustrative of the foregoing is the utilization of cocodiethanolamide with latex paints which comprehend paints which are stable emulsions as well as those which have varying degrees of instability. The addition of cocodiethanolamide in an amount of no less than 0.5% to stable emulsions creates the necessary dispersion so that the particular paints are rendered amenable for aerosolization in conjunction with the other prerequisites of the invention. Similarly, with paints which are in unstable emulsions the addition of sufficient cocodiethanolamide to render same stable plus at least 0.5% by weight thereabove adapt same to constituted an aerosol preparation which thus may be sprayed without foams, film rupture and the like and create a continuous unbroken coating or film upon the applied surface.

The foregoing clearly demonstrates that the specific emulsifiers in latex paint have provided energy that cocodiethanolamide would have had to supply to achieve a stable emulsion had such not been present.

This energy is added to that of the cocodiethanolamide and with the prescribed addition thereof, as in the order of 0.5% to stable emulsions, incorporating sufficient energy to change the stable emulsions into the dispersions suitable for the present invention.

Another example is provided by silicone emulsions* which are useful in developing a hard surface polish. Such silicone emulsions are generally stable so that the mere addition of 0.5% by weight of cocodiethanolamide will alter the character of the stable emulsion from oil in water so that the oil is now in the continuous phase. Such addition will also change the emulsion to the dispersion for the present invention so that the resultant film presented upon application of the particular preparation will be transparent and not creamy like an emulsion indicating that physical and chemical changes have occurred.

*Emulsions offerred by General Electric Co. of Waterford, New York as SM2033, SM2035, etc.

However, even though the foregoing has disclosed that 0.5% of the cocodiethanolamide added to a stable emulsion will endow the preparation with attributes hitherto unachieved in this manner, the cocodiethanolamide may be added in an amount up to but not to exceed 10% and the increased amount will provide desired characteristics, such as, for instance, the degree of cohesiveness, and the particular thickness of the resultant film as may be shown, such amounts within the range of 0.5 to 10% by weight of the preparation being easily experimentally determined.

Active ingredients peculiarly adapted for incorporation in aerosol preparations of the present invention may be water insoluble and comprehend the active phase of water-base paints commonly referred to as latex paints, exemplary of which are acrylic emulsions, vinyl emulsions, vinyl copolymer acetate emulsions, alkyd emulsions and polyurethane emulsions; mold release and lubricating agents, as for instance, silicones, namely the alkyl polysiloxanes and polyorganosiloxanes; lecithin and other soya or animal fat derivatives; stearates, telfluoromers, as Teflon*; also synthetic lubricants, such as butoxylated and ethoxylated glycols; as well as polybutene used for transmission belt dressing, etc; and various common greases, such as lithium stearate, calcium stearate, petroleum, aluminum naphthenate, and the like for utilization as lubricant coatings; moreover, mineral seal oil, as both a penetrant and a lubricant, as well as petroleum based hydrocarbon oils and synthetic oils are amenable to incorporation in preparations of the present invention. A further category of active ingredients would be constituted of the waxes, including animal waxes, such as beeswax and stearic acid; vegetable waxes, such as carnauba, bayberry and candelilla, as well as the various artificial or synthetic waxes as obtained from distillation of paraffin base petroleum. The foregoing enumerated types and examples of active ingredients for forming constituents of aerosol preparations of this invention is not meant to be exhaustive but merely indicative of the comprehensive range of compounds which by virtue of the uniqueness of this invention may now be aerosolized in waterborne systems to provide a continuous film which was heretofore deemed impossible through such aerosolization. All these compositions are of the type wherein the intended usage or purpose requires an unbroken coating.

*TEFLON is a trademark of E. I. DuPont De Nemours & Co., Inc. for tetrafluoroethylene resins.

Other active ingredients suitable for preparations of the present invention are water soluble compounds which, for purposes of illustration only, comprehend:

methoxy polyethylene glycols useful for lubricants and as ointment bases for cosmetics and pharmaceuticals;

water soluble resins, such as hydroxyethyl celluloses and ethylene copolymers useful for coatings, paints, adhesives, caulking compounds, and for textile operations;

water soluble herbicides, such as paraquat, diethanolamine salt of 2,4-dichlorophenoxy acetic acid, diethanolamine salt of 2-(2-methyl-4-chlorophenoxy) propionic acid; and water soluble alkyl glycols and alkyl esters encompassing butoxylated and ethoxylated groups used for lubrication, hydraulic fluids, and for cosmetic and pharmaceutical applications.

Accordingly, the range of treatments is infinite when it is recognized that such preparations can provide lubrication, mold release, adhesives, sealants, water displacement sprays, wax coatings, polymeric finishes, such as for floors and like surfaces; inks and dyes; asphaltic undercoatings, polyurethane coatings, and paints.

The particular propellants embodied in aerosol preparations of the present invention are of generally accepted types, that is liquefied, such as, hydrocarbons or halocarbons, as fluorocarbons, and blends of the same, or compressed gases, or combinations of liquefied and compressed gases. The selection of the foregoing is dependent upon desired characteristics relating to evaporation rate, solubility, economics, pressure and safety. The well known fluorocarbon 12 and fluorocarbon 114 are exemplary of halocarbon propellants equally useful. Generally the hydrocarbon propellants are liquefied petroleum gases, such as propane, butane and isobutane, such being more popular at the present time than the halocarbons due to the possible environmental effects thereof.

Also, compressed gas propellants, such as carbon dioxide, nitrogen, nitrous oxide, and dimethyl ether may be used with the same facility as with other aerosol preparations but with attention, of course, directed to such considerations as stability and pressure requirements for selection determination.

It is to be understood that the choice of propellant in the present invention is indicated by the same considerations as in the aerosol preparations generally and, thus, the precise propellant does not form a part of the present invention.

In order to control the manner in which the propellant leaves the film so that a foam is not created and with the resultant film having the desired leveling characteristics of being relatively smooth and even, with molecular continuity of the active ingredient, a film controlling agent or so-called "film controller" is utilized. As will be developed herein the use of a "film controller" thus obviates the utilization of organic auxiliary solvents. These film controlling agents are of such character that the active ingredients may be substantially insoluble therein. Additionally, such film controlling agents possess an initial boiling point about 300° F. assuring that the water within the film will evaporate at an earlier stage. Although the precise mode of reaction is not fully understood, it is believed that the molecular structure of such film controlling agents exert a repressive effect upon the propellant so as to influence the manner in which the propellant leaves the film. Thus, the inclusion of the novel film controllers in the present preparation in conjunction with the dispersal agent within the range stated in some manner synergistically provides the resultant film with the smooth unbroken character, devoid of pores and other geometric formations associated with foams.

Among the agents suitable for controlling the propellant in the manner above described are mineral oils with boiling points above 300° F. including white oils, such as DRAKEOL*#7, paraffinic oils, and isoparaffinic oils;

including glycols with initial boiling points above 350° F., such as propylene glycol, ethylene glycol, hexylene glycol, dipropylene glycol, diethylene glycol and triethylene glycol;

including glycol ethers with initial boiling points above 350° F., such as dipropylene glycol monomethyl ether, diethylene glycol monoethyl ether, diethylene glycol monomethyl ether, diethylene glycol monobutyl ether and tripropylene glycol monoethyl ether; and including aromatic blends or composition solvents containing a high content of aromatic hydrocarbons with initial boiling points above 360° F., such as HI-SOL 15**. Such so-called film controllers need not possess solvency for the propellant and thus obviate utilization of the heretofore widespread use of organic auxiliary solvents for propellants. If the active ingredient is hydrophobic, it need not be fully soluble in either the propellant or the film controller. It is understood that an inadvertent low degree of solubility of the active ingredient may be tolerated but such is not preferred unless the active ingredient is water soluble. Thus, if during production it was discovered that the active ingredient and the film controlling agent were incompatible, that is, productive of a precipitate, the same would not be intermixed directly, but with the said agent being incorporated subsequent to the inclusion of the water.

*DRAKEOL is a trademark of Pennreco, Inc. to identify a series of white mineral oils, colorless, odorless and tasteless hydrocarbon distillates meeting the U.S.P. XV and N.F. X requirements for "petroleum liquidum".

**HI-SOL is a trademark of Ashland Chemical Company for aromatic petroleum solvents.

These film controllers also allow for another unique property of this invention, that is, the ability to aerosolize active ingredients which are soluble in water but in the past have been more efficaciously delivered in solvent systems. An example of this would be water soluble herbicides, wherein a typical spray would produce beading on the foilage and consequently poor coverage for the herbicide. The nature of this invention is such that the herbicide can now be delivered onto the foilage with molecular continuity, that is, in a smooth, unbroken film making the herbicide much more efficacious. The mechanism that accomplishes this is not fully understood but it is necessary for the active ingredients to be soluble in the film controllers *or* the propellants to allow the invention to work as expected rather than delivering either foam or an uneven or broken film that would be expected in a situation where the active ingredient was fully soluble in the water and a film controller was not present.

Thus, in the present invention the solubility of the propellant in the film controlling agent is a matter of indifference since herein the manner of departure of the propellant from the film is dependent upon a mechanism quite distinct from solution formation.

Aerosol preparations having the properties of the present invention have the following general formula wherein liquefied propellants, namely the hydrocarbons and halocarbons are used:

| | PERCENT BY WEIGHT |
|---|---|
| ACTIVE INGREDIENT | Approx. .1% to 50% |
| PROPELLANT | Approx. 5% to 30% |
| DISPERSAL AGENT: | |
| Cocodiethanolamide | 2.5% to 10% |
| FILM CONTROLLING AGENT | Approx. 1% to 20% |
| WATER | Approx. 10% to 91.4% |

In those preparations wherein compressed gas constitutes the propellant, the general formulation will be as follows:

| | PERCENT BY WEIGHT |
|---|---|
| ACTIVE INGREDIENT | Approx. .1% to Approx. 50% |
| PROPELLANT | Approx. 2% to 5% |
| DISPERSAL AGENT: | |
| Cocodiethanolamide | 2.5% to 10% |
| FILM CONTROLLING AGENT | Approx. 1% to 20% |
| WATER | Approx. 10% to 94.3% |

In those preparations wherein the propellant is constituted of a combination of the liquefied and compressed gases, the general formula will be as follows:

| | PERCENT BY WEIGHT |
|---|---|
| ACTIVE INGREDIENT | Approx. .1% to 50% |
| PROPELLANT | |
| Liquefied | Approx. 2% to 30% |
| Gaseous | Approx. .1% to 5% |
| DISPERSAL AGENT: | |
| Cocodiethanolamide | 2.5% to 10% |
| FILM CONTROLLING AGENT | Approx. 1% to 20% |
| WATER | Approx. 10% to 94.3% |

In the three formulae set forth hereinabove, the active ingredient is not pre-emulsified so that, accordingly, the cocodiethanolamide will be within the range of 2.5% to 10% by weight of the preparation so as to provide the necessary energy for creating a dispersion.

The applications of these formulations will become more intelligible as a study is made of specific formulae hereinbelow. However, it will be observed that the range of cocodiethanolamide is quite defined, all as fully discussed hereinabove; and that with the proportionality of the propellant and the film controlling agents therefor all within the stated ranges. Film controlling agents within an amount less than 1% by weight have not demonstrated the capacity to act efficaciously with the propellant and, similarly, levels above 20% appear to have an adverse effect in controlling the departure of the propellant.

EXAMPLE I

An aerosol preparation for providing a continuous high gloss, hard surface coating may be formulated as follows:

| | PERCENT BY WEIGHT |
|---|---|
| ACTIVE INGREDIENT | |
| Dimethylpolysiloxane (10,000 cs) | 5% |
| Dimethylpolysiloxane (1,000 cs) | 10% |
| FILM CONTROLLING AGENT | |
| White Oil (Drakeol #7) | 5% |
| DISPERSAL AGENT | |
| Cocodiethanolamide | 3% |
| PROPELLANT | |
| 70% Isobutane | 15% |
| 30% Propane | |
| WATER | 62% |

The active ingredient, understandably, comprehends high and low viscosity forms of the dimethylpolysiloxane in accordance with accepted practice for conducing to the flowability of such active ingredient. The isobutane-propane mixture provides a suitable pressure for dispensing but, manifestly, other propellants are equally effective whether the same are liquefied, or compressed gases, or both as is exemplified by the following:

EXAMPLE I(a)

| | PERCENT BY WEIGHT |
|---|---|
| ACTIVE INGREDIENT | |
| Dimethylpolysiloxane (10,000 cs) | 5% |
| Dimethylpolysiloxane (1,000 cs) | 10% |
| FILM CONTROLLING AGENT | |
| White Oil (Drakeol #7) | 5% |
| DISPERSAL AGENT | |
| Cocodiethanolamide | 3% |
| PROPELLANT | |
| Propane (liquefied) | 5% |
| Nitrogen (gaseous) | .5% |
| WATER | 71.5% |

EXAMPLE II

The following exemplifies the constitution of an aerosol preparation in accordance with the present invention useful as a general or all-purpose lubricant:

| | PERCENT BY WEIGHT |
|---|---|
| ACTIVE INGREDIENT | |
| Silicone grease | 3.2% |
| FILM CONTROLLING AGENT | |
| White Oil | 2.5% |
| DISPERSAL AGENT | |
| Cocodiethanolamide | 3% |
| PROPELLANT | |
| Isobutane | 20% |
| WATER | 71.3% |

The foregoing formula relates to a silicone lubricant preparation wherein the active ingredient, although constituting, seemingly, a small percentage of the formula, attains with the water present a continuous film for assuring appropriate, even coverage of the devices or elements to be lubricated.

EXAMPLE III

The formula of this example is merely illustrative of the proportionality of the constituents for bringing about a continuous film as used for a dressing upon belts of various types, such as, conveyors and the like.

| | PERCENT BY WEIGHT |
|---|---|
| ACTIVE INGREDIENT | |
| Polybutene | 10% |
| FILM CONTROLLING AGENT | |
| High Boiling Isoparaffinic Oil | 10% |
| DISPERSAL AGENT | |
| Cocodiethanolamide | 2.5% |
| PROPELLANT | |
| Nitrous Oxide (gaseous) | 4% |
| WATER | 73.5% |

It will be observed that the propellant in the foregoing formula is a compressed gas, nitrous oxide, which thus demonstrates the capability of propellants of all recognized types as being suitable with the present invention.

EXAMPLE IV

This example sets forth a formula for a graphite penetrant which may be aerosolized and provide a film having the desired leveling characteristics:

| | PERCENT BY WEIGHT |
|---|---|
| ACTIVE INGREDIENT | |
| OILDAG* | 1% |
| FILM CONTROLLING AGENT | |
| Mineral Seal Oil | 5% |
| DISPERSAL AGENT | |
| Cocodiethanolamide | 2.5% |
| PROPELLANT | |
| Propane | 10% |
| WATER | 81.5% |

*OILDAG is a trademark of Acheson Colloids Co. of Port Huron, Michigan to identify a concentrated colloidal dispersion of pure electric-furnace graphite in petroleum oil.

This particular formula is of interest in that it demonstrates an active ingredient which is in colloidal dispersion form.

EXAMPLE V

The formula of this particular example demonstrates the usefulness of the present invention for providing an aerosol preparation wherein the active ingredient is a flowable powder:

| | PERCENT BY WEIGHT |
|---|---|
| ACTIVE INGREDIENT | |
| Benzocaine (ethyl-para-aminobenzoate) | 10% |
| FILM CONTROLLING AGENT | |
| Propylene Glycol | 10% |
| DISPERSAL AGENT | |
| Cocodiethanolamide | 3.5% |
| PROPELLANT | |
| Isobutane | 20% |
| WATER | 56.5% |

From this particular example the versatility of the present invention becomes all the more apparent when its applicability to flowable powders is observed. Thus, the utilization in the medical field for topical dressings is of recognized importance, much less the potential for industrial usages of material, such as talc, silica, etc. Therefore, the prospect of providing continuous unbroken films of such materials presents a wide range of application.

EXAMPLE VI

The following formula is revelatory of the usefulness of the present invention to provide a hard surface protector wherein, admittedly, a continuous unbroken film is of extreme criticality:

| | PERCENT BY WEIGHT |
|---|---|
| ACTIVE INGREDIENT | |
| ACRYLOID B66* | 10% |
| FILM CONTROLLING AGENT | |
| HI-SOL 15** | 10% |
| DISPERSAL AGENT | |
| Cocodiethanolamide | 4% |
| PROPELLANT | |
| $CO_2$ (gaseous) | 5% |
| WATER | 71% |

*ACRYLOID is a trademark of Rohm & Haas of Philadelphia, Pennsylvania for acrylic ester resins in organic solvent solution.
**HI-SOL is a trademark of Ashland Chemical Company for aromatic petroleum solvents.

Thus, in this example the active ingredient is actually a solution and in such form is fully effective for aerosolization to present a smooth, even film wherein such ingredient attains molecular continuity.

EXAMPLE VII

The following formula is merely illustrative of the aerosolization of latex paints in accordance with the present invention:

| | PERCENT BY WEIGHT |
|---|---|
| ACTIVE INGREDIENT | |
| Latex Paint | 60% |
| DISPERSAL AGENT | |
| Cocodiethanolamide | 1% |
| FILM CONTROLLING AGENT | |
| White Mineral Oil | 7% |
| PROPELLANT | |
| Propane | 15% |
| WATER | 13% |

In the foregoing example, it is to be observed that the dispersal agent is in the approximate amount of 1% which is quite adequate in view of the fact that the latex paint is a stable emulsion so that a lesser amount of the dispersal agent is needed to provide the energy for effecting the requisite dispersion than in those systems wherein the active ingredient is not in an emulsion. The particular amount of the disperal agent being greater than 0.5% is in the stated proportionality to provide a certain desired cohesiveness and thickness to the resultant film.

EXAMPLE VIII

This following formula is fundamentally along the lines of the preceding example in demonstrating the applicability of the present invention for use with active ingredients which are in an emulsion:

-continued

| | PERCENT BY WEIGHT |
|---|---|
| ACTIVE INGREDIENT | |
| Silicone Emulsion* | 69.5% |
| DISPERSAL AGENT | |
| Cocodiethanolamide | 0.5% |
| FILM CONTROLLING AGENT | |
| DRAKEOL #7** | 10% |
| PROPELLANT | |
| Isobutane | 20% |

*Typical silicone emulsions are the preparations of General Electric Co. identified as SM2033 and SM2035 which are silicones of different viscosities; which latter may be in a 50:50 relationship in this formulation.
**See the first footnote on Page 18.

The foregoing does not require the addition of water in view of the inclusion of the same within the emulsion of the active ingredient. The dispersal agent is included in the minimal amount to bring about a dispersion in view of the fact that the active ingredient is in a stable emulsion. Also in this particular formula the film controlling agent is added after or with the dispersal agent in view of its lack of compatibility with the particular active ingredient in its emulsion.

In studying the foregoing formulae it will be appreciated that there has been no indication of the inclusion of customary preservatives and anti-corrosion agents; the use of which would be pursuant to the usual considerations and in keeping with customary techniques.

The formulations herewith submitted serve to demonstrate the broad range of active ingredients that may be incorporated in preparations of this invention for continuous film formation. It is understood that all of the various propellants and film controllers set forth in the foregoing as examples are equally effective as are the corresponding components set forth in the specific examples which latter establish the effectiveness of the present invention for myriad purposes.

The production of aerosol preparations conforming to the present invention may be effected in most facile manners, with all involved steps being generally undertaken under normal ambient conditions and thus obivating the necessity of environmentally controlled conditions.

One such procedure is: the continuous phase is first prepared by intermixing the particular active ingredient in the indicated proportion and the selected film controller or film controlling agent when the same are compatible; that is, wherein upon intermixture a precipitate or other undesired chemical reaction does not result. There is then added to the mixture the requisite amount of the dispersal agent, cocodiethanolamide, with intermixing being continued. As thus prepared the active ingredient phase is subjected to agitation during which the prescribed quantity of water is blended in and agitation is maintained to effect an intermixture of the phases. The ultimate dispensing container is then filled, in accordance with present technology, with the intermixture which has been maintained in an agitated state to the point of filling. Thus, the propellant is the last constituent to be introduced. Substantially instantaneously upon discontinuance of the agitation, the water phase and the active ingredient phase will separate and remain in such separated state pending subsequent agitation immediately prior to dispensing.

However, in the event the particular active ingredient and the film controlling agent are not compatible, that is, wherein the same upon intermixture would tend to cause a precipitate to form or some other unwanted chemical reaction, the film controlling agent is not added until after the water has been provided. By introducing the film controlling agent at this particular stage, the formation of a precipitate is obviated. Examples VI, VII, and VIII hereinabove are, as stated, demonstrative of formulations wherein a precipitate would form upon the intermixture of the active ingredient and the film controlling agent so that in developing the aerosol preparations of said formulations the film controlling agent is added after the water has been incorporated. The procedure for developing any of the myriad formulations embodying the present invention is accomplished in an economical manner, being fully suitable for high volume production, so as to obviate expenditure for complex, costly equipment or the maintenance of close tolerance conditions.

Immediately prior to a proposed usage, the container for the particular preparation is manually agitated by the user which brings about a transitory mixture of the two phases being, in essence, a quick or temporary dispersion in which state the discharge occurs. Upon discontinuing discharging the phases promptly separate into the normal, basically two phase condition and remain in such state pending subsequent discharge. Thus, the shelf life of aerosol preparations as developed herein is extensive since the cyclic mixing and separation as developed through use and through non-use has no deleterious effect upon the ingredients and the phases so that regardless of the passage of time the continuous film produced by this invention is assured.

As developed hereinabove, aerosol preparations may be formulated according to the present invention wherein the active ingredient is in an emulsion in its pre-preparation state. Thus, the water-base paints are recognized as being in emulsions, but any of the water insoluble active ingredients herein identified may also, if desired, be pre-emulsified. Recognizedly, in view of the water content of any such pre-emulsions, the water constituent of the preparation of the present invention will be, accordingly, affected.

Thus, the following will constitute general formulae depending upon the nature of the propellant used for those active ingredients which have been pre-emulsified, all as should be apparent from the above disclosure.

In those preparations wherein the propellants are liquefied, namely from the group consisting of hydrocarbons and halocarbons, the following is applicable:

| | PERCENT BY WEIGHT |
|---|---|
| ACTIVE INGREDIENT IN EMULSIONS (Excluding Any Solvent in the Emulsion) | Approx. 1% to 93.5% |
| PROPELLANT (Liquefied) | Approx. 5% to 30% |
| DISPERSAL AGENT: | |
| Cocodiethanolamide | 0.5% to 10% |
| FILM CONTROLLING AGENT | Approx. 1% to 20% |
| WATER | 0 to Approx. 92.5% |

In those preparations wherein compressed gas constitutes the propellant, the general formulation will be as follows:

| | PERCENT BY WEIGHT |
|---|---|
| ACTIVE INGREDIENT IN EMULSIONS (Excluding Any Solvent in the Emulsion) | Approx. 1% to 94.5% |
| PROPELLANT (Gaseous) | Approx. 2% to 5% |
| DISPERSAL AGENT: | |
| Cocodiethanolamide | 0.5% to 10% |
| FILM CONTROLLING AGENT | Approx. 1% to 20% |
| WATER | 0 to Approx. 89.5% |

In those preparations wherein the propellant is constituted of a combination of the liquefied and compressed gases, the general formula will be as follows:

| | PERCENT BY WEIGHT |
|---|---|
| ACTIVE INGREDIENT IN EMULSIONS (Excluding Any Solvent in the Emulsion) | Approx. 1% to 94.3% |
| PROPELLANT | |
| Liquefied | Approx. 2% to 30% |
| Gaseous | Approx. .1% to 5% |
| DISPERSAL AGENT: | |
| Cocodiethanolamide | 0.5% to 10% |
| FILM CONTROLLING AGENT | Approx. 1% to 20% |
| WATER | 0 to Approx. 89.3% |

I claim:

1. As aerosol preparation being non-emulsified and in the form of a dispersion for providing upon dispensing and applying to a surface a continuous, uninterrupted film comprising an active ingredient from the class consisting of initially pre-emulsified or partially pre-emulsified water insoluble compounds within the range of approximately 1 to 94.5% by weight of the preparation, a propellant from the class consisting of liquefied hydrocarbons and halocarbons, compressed gases, and combinations thereof, a film controlling agent within the range of approximately 1% to 20% by weight of the preparation for controlling the manner in which the propellant leaves the provided film, said propellant being soluble or insoluble in said agent, and a dispersal agent consisting of cocodiethanolamide within the range of 0.5 to 10% by weight of the preparation and being within such range in such relative amount as to be in excess of that required for stabilization of said active ingredient in emulsion form, said cocodiethanolamide being an amber liquid having a congealing point of approximately 6 degrees C., a specific gravity at 25 degrees C. of about 0.99, containing a maximum of about 3-4 percent free or unreacted fatty acid (as lauric acid) and having a pH value of 8-9 as a one percent dispersion in water, and being soluble in alcohols, glycols, ketones, esters, aromatic and aliphatic hydrocarbons, and chlorinated solvents, and also being dispersible in water at low concentrations of 1% to 2%.

2. An aerosol preparation being non-emulsified and in the form of a dispersion for providing upon dispensing and applying to a surface a continuous, uninterrupted film comprising first and second generally immiscible, distinct, separated phases whereby said preparation in its normal state is unhomogenized, said two phases being transitorily miscible upon agitation, said first phase being aqueous, said second phase comprising an active ingredient from the class consisting of initially pre-emulsified or partially pre-emulsified water insoluble compounds within the range of approximately 1 to 94.5% by weight of the preparation for formation of said film with molecular continuity of the said active ingredient, a propellant from the class consisting of liquefied hydrocarbons and halocarbons, compressed gases, and combinations thereof, and a film controlling agent within the range of approximately 1% to 20% by weight of the preparation for controlling the manner in which the propellant leaves the provided film, said propellant being soluble or insoluble in said agent, and with there being a dispersal agent provided in said second phase but being soluble in both said first and second phases and consisting of cocodiethanolamide within the range of 0.5 to 10% by weight of the preparation and being within such range in such relative amount as to be in excess of that required for stabilization of said active ingredient in emulsion form by at least 0.5% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%.

3. An aerosol preparation according to claims 1 or 2 wherein the active ingredient and the water jointly constitute more than 50% by weight of the preparation.

4. An aerosol preparation according to claims 1 or 2 and characterized by the active ingredient comprising the pre-emulsified or partially pre-emulsified active phase of water-base paints, waxes, greases, polysiloxanes, alkyl polysiloxanes, polyorganosiloxanes, polybutene, petroleum based hydrocarbon oils and synthetic oils.

5. An aerosol preparation according to claims 1 or 2 wherein the dispersal agent consisting of cocodiethanolamide is in an amount not exceeding 2.5% by weight of the preparation.

6. An aerosol preparation according to claims 1 or 2 wherein the active ingredient is from the class consisting of liquids and flowable powders.

7. An aerosol preparation according to claim 2 and further characterized by the cocodiethanolamide having different degrees of solubility in said first and second phases of said preparation.

8. An aerosol preparation according to claims 1, 2 or 7 wherein said film controlling agent is from the class consisting of mineral oils having boiling points above 300° F., glycols having an initial boiling point above 350° F., glycol ethers having an initial boiling point above 350° F. and aromatic blends with initial boiling points above 360° F.

9. An aerosol preparation according to claim 1 and characterized by said propellant being from the class consisting of liquefied hydrocarbons and halocarbons, said propellant constituting approximately 5% to 30% by weight of the preparation.

10. An aerosol preparation according to claim 1 and characterized by said propellant being from the class consisting of compressed gases, said propellant constituting approximately 2% to 5% by weight of the preparation.

11. An aerosol preparation according to claim 1 and characterized by said propellant being a combination of compressed gases and a liquefied hydrocarbon or halocarbon, said propellant constituting approximately 2.1% to 35% by weight of the preparation wherein the gaseous component does not exceed approximately 5% and said liquefied component does not exceed approximately 30%.

12. An aerosol preparation according to claim 1 wherein the active ingredient is from the class consisting of pre-emulsified water insoluble compounds comprising the active phase of water-base paints, waxes, greases, polysiloxanes, alkylpolysiloxanes, polyorganosiloxanes, polybutene, petroleum based hydrocarbon oils, and synthetic oils, the film controlling agent is in an amount constituting approximately 1% to 20% by weight of the preparation, the propellant is from the class consisting of liquefied hydrocarbons and halocarbons constituting approximately 5% to 30% by weight of the preparation and the cocodiethanolamide is within the range of 0.5% to 10% by weight of the preparation.

13. An aerosol preparation according to claim 12 wherein the film controlling agent is from the class consisting of mineral oils having boiling points above 300° F., glycols having an initial boiling point above 350° F., glycol ethers having an initial boiling point above 350° F. and aromatic blends with initial boiling points above 350° F., and the water is in an amount up to approximately 92.5% by weight of the preparation sufficient to complete the preparation.

14. An aerosol preparation according to claim 12 wherein the film controlling agent is from the class consisting of mineral oils having boiling points above 300° F., glycols having an initial boiling point above 350° F., glycol ethers having an initial boiling point above 350° F. and aromatic blends with initial boiling points above 360° F., and the water is in an amount up to approximately 89.5% by weight of the preparation sufficient to complete the preparation.

15. An aerosol preparation according to claim 1 wherein the active ingredient is from the class consisting of pre-emulsified water insoluble compounds comprising the active phase of water-base paints, waxes, greases, polysiloxanes, alkylpolysiloxanes, polyorganosiloxanes, polybutene, petroleum based hydrocarbon oils, and synthetic oils, the film controlling agent is in an amount constituting approximately 1% to 20% by weight of the preparation, the propellant constituting a combination of compressed gases and a liquefied hydrocarbon or halocarbon, said propellant constituting approximately 2.1% to 35% by weight of the preparation wherein the gaseous component does not exceed approximately 5% and said liquefied component does not exceed approximately 30%.

16. An aerosol preparation in the form of a dispersion for providing upon dispensing and applying to a surface a continuous, unbroken film comprising an active ingredient from the class consisting of water soluble compounds, said water soluble compounds within the range of approximately 0.1 to 50% by weight of the preparation, a propellant, said propellant being in an amount sufficent for pressurized propulsion of the preparation for discharge purposes, a film controlling agent for controlling the manner in which the propellant leaves the provided film, said film controlling agent being within the range of approximately 1 to 20% by weight of the preparation, water, and a dispersal agent consisting of cocodiethanolamide within the range of 2½% to 10% by weight of the preparation, said cocodiethanolamide being an amber liquid having a congealing point of approximately 6 degrees C., a specific gravity at 25 degrees C. of about 0.99, containing a maximum of about 3–4 percent free or unreacted fatty acid (as lauric acid) and having a pH value of 8–9 as a one percent dispersion in water, and being soluble in alcohols, glycols, ketones, esters, aromatic and aliphatic hydrocarbons, and chlorinated solvents, and also being dispersible in water at low concentrations of 1% to 2%.

17. An aerosol preparation according to claim 16 werein the class of water soluble compounds comprises methoxy polyethylene glycols, water soluble resins, water soluble herbicides and water soluble alkyl glycols and alkyl esters encompassing butoxylated and ethoxylated groups.

18. An aerosol preparation according to claims 16 or 50 wherein the active ingredient is soluble in the film controlling agent.

19. An aerosol preparation according to claims 16 or 17 wherein the active ingredient is soluble in the propellant.

20. An aerosol preparation according to claim 17 wherein said film controlling agent is from the class consisting of mineral oils having boiling points above 300° F., glycols having an initial boiling point above 350° F., glycol ethers having an initial boiling point above 350° F. and aromatic blends with initial boiling points above 360° F.

21. An aerosol preparation according to claims 16, 17 or 20 wherein the propellant is from the class consisting of liquefied hydrocarbons and halocarbons, compressed gases, and combinations thereof.

22. An aerosol preparation according to claim 16 wherein the active ingredient is from the class consisting of liquids and flowable powders.

23. An aerosol preparation being non-emulsified and in the form of a dispersion for providing upon dispensing and applying to a surface a continuous, uninterrupted film comprising an active ingredient from the class consisting of initially pre-emulsified or partially pre-emulsified water insoluble compounds within the range of approximately 1 to 94.5% by weight of the preparation, said active ingredients including the active phase of water-base paints, waxes, greases, polysiloxanes, alkyl polysiloxanes, polyorganosiloxanes, polybutene, petroleum based hydrocarbon oils and synthetic oils, a propellant from the class consisting of liquefied hydrocarbons and halocarbons, compressed gases, and combinations thereof, said propellant being in an amount by weight of the preparation sufficient for pressurized propulsion of the preparation for dispensation purposes, a film controlling agent within the range of approximately 1% to 20% by weight of the preparation for controlling the manner in which the prepellant leaves the provided film, said film controlling agent is from the class consisting of mineral oils having boiling points above 300° F., glycol ethers having an initial boiling point above 350° F. and aromatic blends with initial boiling points above 360° F., said propellant being soluble or insoluble in said agent, and a dispersal agent consisting of cocodiethanolamide within the range of 0.5 to 10% by weight of the preparation and being within such range in such relative amount as to be in excess of that required for stabilization of said active ingredient in emulsion form, said cocodiethanolamide being an amber liquid having a congealing point of approximately 6 degrees C., a specific gravity at 25 degrees C. of about 0.99, containing a maximum of about 3-4 percent free or unreacted fatty acid (as lauric acid) and having a pH value of 8-9 as a one percent dispersion in water, and being soluble in alcohols, glycols, ketones, esters, aromatic and aliphatic hydrocarbons, and chlorinated solvents, and also being dispersible in water at low concentrations of 1% to 2%.

* * * * *